Patented Mar. 31, 1925.

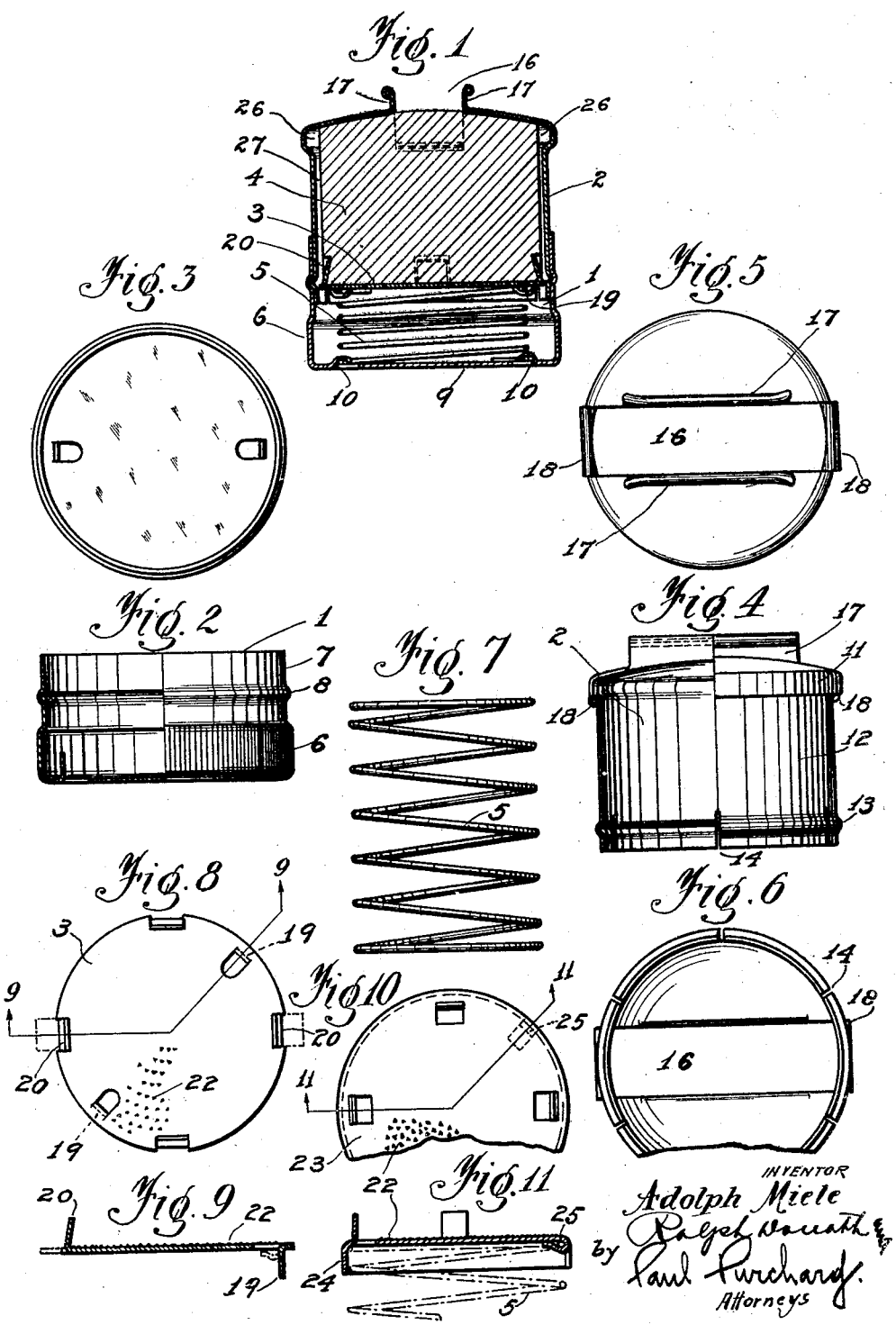

1,531,869

UNITED STATES PATENT OFFICE.

ADOLPH MIELE, OF PITTSBURGH, PENNSYLVANIA, ASSIGNOR TO WEAREVEN ROSIN COMPANY, OF PITTSBURGH, PENNSYLVANIA, A CORPORATION OF DELAWARE.

CONTAINER.

Application filed April 12, 1923. Serial No. 631,545.

*To all whom it may concern:*

Be it known that I, ADOLPH MIELE, a subject of the King of Italy, residing at Pittsburgh, in the county of Allegheny and State of Pennsylvania, have invented certain new and useful Improvements in Containers, of which the following is a specification.

This invention relates to containers and more in particular to containers for holding cakes of rosin as used by musicians for the bows of their string instruments.

One of the principal objects of this invention is to provide a rosin container of neat appearance and low cost of manufacture which will prevent the user's hands from becoming soiled or sticky from the rosin dust, while applying the rosin to the horse hair of the bow or while handling the rosin. Another object is to provide a container of this type in which the cake of rosin is so held as to enable uniform wearing of the rosin. A further object is to provide a protective container for the rosin in which the latter will be fed forward automatically as the cake of rosin wears down. Still a further object of this invention is to provide in the container special means for securing the cake of rosin therein. Additional features and advantages of this invention will appear from the following specification taken in connection with the drawings which form a part of this application.

Referring to the drawings,

Fig. 1 is a cross-sectional view showing the complete container with a cake of rosin mounted therein and ready for use.

Fig. 2 is a side view, partly in section of the bottom shell of the container.

Fig. 3 is a top plan view of Fig. 2.

Fig. 4 is a side view, partly in section of the top shell of the container.

Fig. 5 is a top view of Fig. 4.

Fig. 6 is a fractional bottom plan view of Fig. 4.

Fig. 7 is a side elevation of a spring used in my container for supporting the cake of rosin.

Fig. 8 is a plan view of the plate holding the cake of rosin.

Fig. 9 is a cross-sectional view taken on line 9—9 in Fig. 8.

Fig. 10 is a partial top plan view of a modified construction of the plate holding the cake of rosin.

Fig. 11 is a cross-sectional view taken on line 11 in Fig. 10.

Reference being had to the various drawings, my container consists of a bottom shell 1, a top shell 2, a support plate 3 for the cake of rosin 4, and a spring 5 secured in the bottom shell and supporting the plate 3.

The bottom shell is provided with a knurled collar 6 surmounted by the slightly reduced body 7 upon which a peripheral bead 8, preferably of concavo-convex shape, has been formed. In the bottom 9 of said shell are provided two or more tongues 10 which are preferably stamped out of the bottom, whereby the spring 5 can be securely held to the bottom shell by depressing said tongues over the spring wire.

The upper shell is composed of the top part 11 and the body part 12 which has been shown as snugly engaging the inside of the bottom body 7. Upon the body part 12 is also formed a peripheral bead 13 of suitable size and shape to fit within the outside bead 8. If desired, or found necessary, the lower end of the body part 12 may be furnished with slots 14 of suitable depth to facilitate the insertion of the top shell into the bottom shell, thus obtaining a connection similar to that found in the well known snap-buttons. The top part 11 is provided with a slot 16 extending across the whole diameter of the top shell and of sufficient width to accommodate the horse hair of a bow. On the long sides of said slot are provided the up-turned lugs 17, the purpose of which is to guide the movements of the bow. The lugs 17, as well as the narrow sides 18 of the slot 16 are suitably rounded off or beaded to prevent the cutting of the horse hair as the bow is passed to and fro in the act of applying the rosin.

The supporting plate 3 is provided with the depending tongues 19 by means of which the former is secured to the spring 5. A plurality of concentrically disposed lugs 20 are also formed on the plate to afford a holding and centering means for the cake of rosin on the plate.

My preferred method of securing the cake of rosin on the plate 3 is to first insert the cake between the close fitting lugs 20 and then apply a lighted match to the underside of the plate, to cause the rosin to melt a sufficient amount to stick to the upper side of the plate. To better insure the adhesion of the cake to the plate, the top of the latter is preferably roughened, as indicated by the numeral 22.

In the modified construction shown in Figs. 10 and 11, the supporting plate 23 is provided with a downwardly directed circumferential band 24 in which two, or more, tongues 25 have been cut to secure the plate to the spring 5. The purpose of this border is to prevent the flame and smoke issuing from a lighted match to reach the sides of the cake of rosin, thus melting or blackening it.

It is obvious that, when the rosin is applied to the plate 3, or 23, the bottom shell is naturally separated from the top shell; the height of the extended spring will reach considerably above the top edge of the bottom shell to permit the easy insertion of a lighted match between the turns of the spring and under the plate.

When applying rosin to a bow with my device, the bow is held in one hand and the container in the other. As the bow is passed over the cake of rosin, the bottom shell is gradually revolved between the fingers, thus causing the cake to revolve also while the top shell is prevented from rotating by the lugs 17 engaging the sides of the bow. A uniform wear of the rosin is thus obtained, as well as a great economy in rosin.

The dust particles of rosin which are liberated by the passage of the bow over the cake of rosin are caught in the open space 26 and from there deposited in the bottom shell 1 owing to the clearance space 27 left between the cake of rosin and the inside of the container.

Although I have described my container as applied to cakes of rosin, it is evident that other uses could be made of it without making such important changes in the construction as would exclude the modification from the scope of the appended claims. I have especially in mind the use of my container in connection with cakes of compressed tooth power, or for holding cakes of chalk used for chalking so called "chalk lines", etc.

Many changes in the precise construction, arrangement and combination of the various parts may be made without exceeding the scope of the claims and I reserve the liberty of making all such changes as may be thought desirable.

What I claim is:

1. In combination, a cylindrical container comprising a bottom shell and a top shell; a cake of rosin positioned within said container; a supporting plate for said rosin; a resilient support for said plate secured to said bottom shell; means for securing said rosin to said supporting plate; said bottom shell and top shell having each a peripheral groove co-acting to allow free rotation of one shell around the other and prevent undesired axial disengagement thereof; an aperture provided across the top of said top shell to give access to said rosin; said resilient support for said plate being so proportioned as to elevate said plate a considerable distance above the top of said bottom shell when fully extended.

2. In combination, a cylindrical container comprising a bottom shell and a top shell; a cake of rosin positioned within said container; a supporting plate for said rosin; a resilient support for said plate secured to said bottom shell and to said plate; circumferentially disposed means on said plate for securing thereto said cake of rosin; means provided on the upper face of said plate for increasing the adhesion thereto of said cake; said bottom shell and top shell having each a peripheral groove co-acting to allow free rotation of one shell around the other and prevent undesired axial disengagement thereof; an aperture provided across the top of said top shell to give access to said rosin; said resilient support for said plate being so proportioned as to elevate said plate a considerable distance above the top of said bottom shell when fully extended.

In testimony whereof I affix my signature.

ADOLPH MIELE.